United States Patent
Lüdemann et al.

(10) Patent No.: US 9,996,073 B2
(45) Date of Patent: Jun. 12, 2018

(54) METHOD FOR OPERATING A PLANT FOR PRODUCING TABLETS

(75) Inventors: Stefan Lüdemann, Hamburg (DE); Matthias Meier, Schwarzenbek (DE)

(73) Assignee: FETTE COMPACTING GMBH, Schwarzenbek (DE)

( * ) Notice: Subject to any disclaimer, the term of this patent is extended or adjusted under 35 U.S.C. 154(b) by 799 days.

(21) Appl. No.: 14/116,280

(22) PCT Filed: Apr. 19, 2012

(86) PCT No.: PCT/EP2012/001691
§ 371 (c)(1),
(2), (4) Date: Jan. 16, 2014

(87) PCT Pub. No.: WO2012/152375
PCT Pub. Date: Nov. 15, 2012

(65) Prior Publication Data
US 2014/0195036 A1    Jul. 10, 2014

(30) Foreign Application Priority Data
May 10, 2011    (DE) .................. 10 2011 101 288

(51) Int. Cl.
 *B30B 11/08* (2006.01)
 *B30B 11/02* (2006.01)
 (Continued)

(52) U.S. Cl.
 CPC .......... *G05B 19/406* (2013.01); *B30B 11/005* (2013.01); *B30B 11/08* (2013.01); *B30B 15/028* (2013.01)

(58) Field of Classification Search
 CPC ..... B30B 11/08; B30B 11/005; B30B 11/028; B30B 11/026; B30B 11/085;
 (Continued)

(56) References Cited

U.S. PATENT DOCUMENTS 5,258,916 A * 11/1993 Langheinrich ......... D01H 13/32
 57/264
6,679,821 B1 * 1/2004 Numata .................. B04B 13/00
 494/10
(Continued)

FOREIGN PATENT DOCUMENTS

DE    19920377    11/2000
DE    19933817    1/2001
(Continued)

OTHER PUBLICATIONS

Knoechel et al., Instrumented Rotary Tablet Machines I, Sep. 2006, 7 pages.*

(Continued)

*Primary Examiner* — Thuy Dao
(74) *Attorney, Agent, or Firm* — Vidas Arrett & Steinkraus

(57) ABSTRACT

A method for operating a plant to produce tablets that has at least one rotary press and one computer system, wherein the computer system contains operating and control software for controlling and monitoring the operation of the rotary press, and wherein the rotary press is designed for installing different types of rotors, wherein a record adapted to the respective rotor type is saved in a memory and communication component on the rotors, and before the rotor type is initially operated, the record is read out and is saved in the computer system to automatically adapt the operating and control software and user interface to the rotor type.

12 Claims, 1 Drawing Sheet

(51) Int. Cl.
  *B30B 11/00* (2006.01)
  *B29C 43/08* (2006.01)
  *G05B 19/406* (2006.01)
  *B30B 15/02* (2006.01)

(58) Field of Classification Search
  CPC . B30B 11/0023; B30B 15/028; G05B 19/406; A61K 2300/00; A61K 9/2054; A61K 9/2018; B01D 15/1892; G01N 2030/381; G01N 2035/00495
  See application file for complete search history.

(56) References Cited

U.S. PATENT DOCUMENTS

| | | | |
|---|---|---|---|
| 7,379,783 B2 | 5/2008 | Popp | |
| 7,379,784 B2 | 5/2008 | Popp | |
| 7,392,107 B2 | 6/2008 | Popp | |
| 7,641,465 B2 * | 1/2010 | Meissner | B30B 11/08 425/345 |
| 7,641,466 B2 * | 1/2010 | Malick | B30B 11/08 425/345 |
| 7,713,469 B2 * | 5/2010 | Schmidt | B29C 43/08 419/49 |
| 7,740,140 B2 * | 6/2010 | Schmidt | B30B 11/005 209/44.2 |
| 7,799,273 B2 | 9/2010 | Popp | |
| 8,162,650 B2 * | 4/2012 | Roemer | B30B 15/304 425/256 |
| 8,525,050 B2 * | 9/2013 | Naeve | B30B 11/005 177/50 |
| 8,550,804 B2 * | 10/2013 | Mies | B30B 11/08 425/345 |
| 8,660,680 B2 | 2/2014 | Popp | |
| 2003/0161907 A1 | 8/2003 | Hinzpeter et al. | |
| 2005/0120142 A1 * | 6/2005 | Hall | B04B 13/00 710/1 |
| 2005/0153823 A1 * | 7/2005 | Fujimaki | B04B 5/0414 494/7 |
| 2006/0222705 A1 * | 10/2006 | Flanner | A61J 3/10 424/464 |
| 2007/0164480 A1 * | 7/2007 | Schmidt | B29C 43/08 264/319 |

FOREIGN PATENT DOCUMENTS

| | | |
|---|---|---|
| DE | 10207764 | 9/2003 |
| DE | 202005017516 | 1/2006 |
| EP | 0620108 | 10/1994 |
| JP | 58-125697 | 7/1983 |
| JP | 58125697 | 8/1983 |
| JP | S6368236 | 3/1988 |
| JP | S63165027 | 7/1988 |
| JP | 2003001342 | 1/2003 |

OTHER PUBLICATIONS

Pharm Tech Korea, Rotary Tablet Press PR 3000 Series, Jun. 2009, 6 pages.*

* cited by examiner

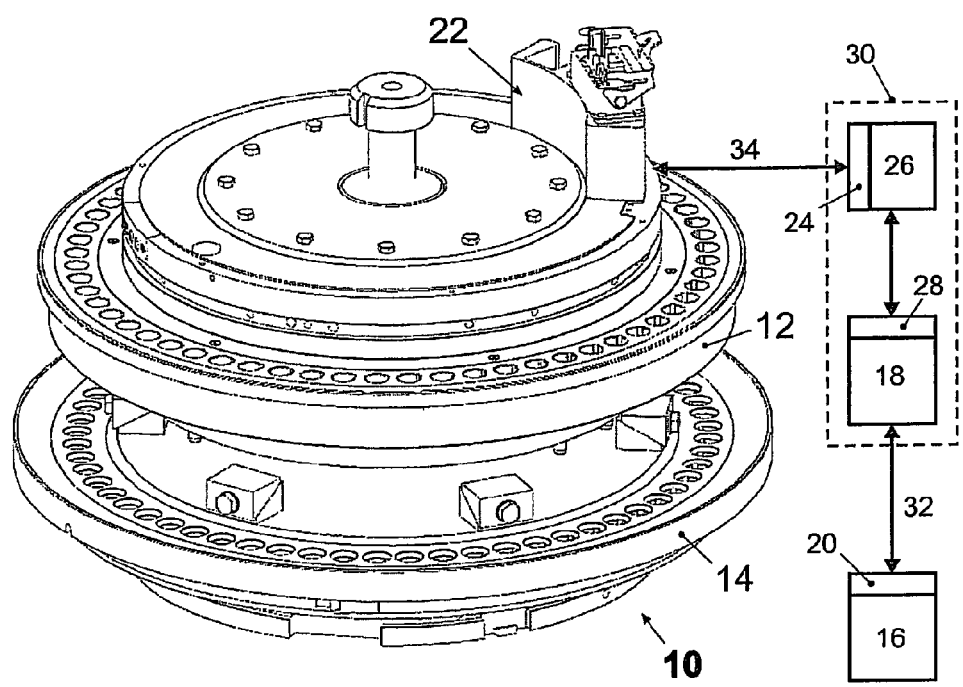

METHOD FOR OPERATING A PLANT FOR PRODUCING TABLETS

CROSS-REFERENCE TO RELATED APPLICATIONS

This application is a U.S. National Stage Application which claims priority to PCT/EP2012/001691, filed Apr. 19, 2012, which claims priority to DE 10 2011 101 288.9 filed May 10, 2011, the entire contents of both of which are hereby incorporated by reference.

STATEMENT REGARDING FEDERALLY SPONSORED RESEARCH

Not applicable

BACKGROUND OF THE INVENTION

The invention relates to a method for operating a plant for producing tablets.

A plant for producing tablets typically contains a so-called rotary press. The main component of the rotary press is a rotor that accommodates a set of lower and upper punches. The punches work together with dies in a die plate of the rotor, wherein a stationary filling device sequentially fills holes in the die before the added material can be compressed with the assistance of the press punches. When the general term "rotor" is used in the following and above, it also includes the "rotor package" i.e., the parts belonging to the rotor that form the unit which can be installed and removed with the rotor. This includes for example the cam carriers for the cams that control the punches while the rotor is rotating.

A computer system is used to control the operation and monitoring of such a rotary press. To this end, the rotary press contains a series of signal generators that emit signals on the condition, arrangement and function of components and assemblies of the press, the signals being processed in the computer system. For example, the pressure rollers are assigned pressure measuring devices that determine the maximum pressure and its progress. Overall, the computer system contains operating and control software for controlling and monitoring the operation of the rotary press. The relevant details will not be further addressed, however. The communication between the rotary press and computer system normally occurs by means of a wired signal connection such as a cable. It is however also possible to transmit data free of contact or wirelessly.

For a press, DE 199 33 817 A1 discloses assigning the upper and lower tool a memory that can be read with the assistance of a reading head. For example, the operating life of the punch tools can be monitored with the assistance of such an arrangement. DE 199 20 377 A1 discloses a communication system of actuators and sensors in the tablet machine as well as a control computer. Communication occurs by means of a bus system.

DE 102 07 764 B4 discloses providing a plurality of components and/or assemblies of the rotary press with a transponder, and saving at least one identification number in the transponders that identifies the components and/or assembly. A component and/or assembly plan is saved in the computer system. After the tabletting machine is assembled, the transponders are read with a reading head connected to the computer system. The read-out data are compared in the computer system with the component and/or assembly plan. In this manner, it is possible to automatically monitor a rotary press during assembly.

The rotors or rotor package in rotary presses are normally removed as a unit, for example to clean the press. In addition, different rotors can be used in a rotary press. Types of production are accordingly distinguished, for example depending on whether monolayer, two-layer or three-layer tablets are to be produced. The operation and control of the rotary press differs depending on the type of production. When installing a different rotor package, it has been normal up to now to make manual entries on the operating terminal of the computer system by means of which the operating and control software is adapted to the type of rotor.

However, it takes time to manually enter information on the respective rotor type. In addition, incorrect entries can be made which can cause the tablet press to become damaged or malfunction. An important piece of information for identifying a rotor type is the station number that indicates the number of dies or die holes and punch pairs. If the station number is incorrectly entered, the bad tablets are not sorted out. Bad tablets become part of the good product, and a complete batch may have to be discarded which of course not only takes additional time but also causes a loss of material.

The object of the invention is therefore to present a system for producing tablets in which the operating and control software in a computer system is automatically adapted to the different rotor packages.

BRIEF SUMMARY OF THE INVENTION

In the method according to the invention, a record adapted to the rotor type is archived in a memory and communication component on the rotor packages. Before initial operation of the rotor type, the record is read out and entered into the computer system to automatically adapt the operation and control software and user interface to the rotor type.

It is also conceivable to save the specific rotor package data necessary for operation in a memory of the computer system, for example in a table for all of the different rotor packages that can be installed in the rotary press, and to assign these characteristics to the rotor types. Before the initial operation of a rotor, its characteristics are read out and, in the computer, the assigned operating and control data are output from the computer memory to be sent to the control and operating software.

According to one embodiment of the invention, the record is read out when the rotor is located outside of the rotary press. Alternately, the record is read out when the rotor is located inside the rotary press.

According to another embodiment of the invention, the data are transmitted from the memory and communication component to the computer system and vice versa, contact-free or wirelessly. Of course, this can also be done involving contact, or wired, by means of a plug-in connection. Such a plug-in connection is of course only temporarily necessary for the period of data transmission and is disconnected once the rotor is installed in the machine, or before the tablet press starts operating when the communication component is arranged on a rotating part of the rotor or package. If it is located on the cam carrier, for example, the cable connection can be continuously maintained.

In its most general and comprehensive form, the method according to the invention provides saving rotor-specific identification and/or specification and/or operating and/or monitoring data in the memory and communication component. The above classification should only serve as a general organizational framework; it is not a generally binding definition. The identification data include for example information on the rotor type and its purpose. The specifications include for example the operating life, the station number, various manufacturer data, information on feasible types of production, desired speed, and information on the maximum pressure. Operating data are past and future operating hours, information on the life cycle of the rotor package, actual speeds, actual pressures, and actual pressure characteristics. Error diagnoses, orders of replacement parts, the monitoring of servicing intervals, to cite just a few examples, are performed with the assistance of monitoring data, preferably online or through remote servicing. In the following, a few embodiments of the invention will be further specified.

When modifying the operating and control software in the computer system while adapting to the rotor type to be used, it is not automatically ensured that a rotor is potentially used that is unsuitable for the rotary press. Accordingly, in a different embodiment of the invention, the rotor type is saved in the memory and communication component, and the operating and control software is designed so that an incorrect rotor can be identified and displayed.

According to a different embodiment of the invention, the operating life of the rotor and operating hours of the rotor are saved in the memory and communication component. Servicing intervals can thereby be automatically maintained. In addition, it can be determined when the rotor needs to be retooled or exchanged because it has reached the end of its operating life.

With the assistance of the method according to the invention, a great deal of information can be exchanged between the rotor and computer system. For example as mentioned, the production type can be saved in the memory and communication component that generally defines how to use and control the tablet press. The rotor type can for example be used for single-layer, two-layer or three-layer tablets, or also for a special production of tablets. By reading out the type of rotor package, the data can be accessed in certain circumstances online or by means of remote servicing in order to perform an error diagnosis or order replacement parts. Another important piece of information of a rotor type is its station number. If there is an incorrect entry, the bad tablets are not sorted out, i.e., bad tablets can become part of the good product. Special configurations of a rotor package can also be automatically recognized and used to adapt the operating and control software. For example, the maximum rotor speed, the maximum pressure, etc. can be take into consideration.

The method according to the invention allows the rotor type to be automatically recognized, and the control and operating software and user interface to be adapted to this rotor type. It prevents people and the press from being harmed when a rotor is exchanged. The method according to the invention allows any information on the rotor package to be saved, updated and read out. An incorrect rotor type is recognized.

BRIEF DESCRIPTION OF THE SEVERAL VIEWS OF THE DRAWINGS

Exemplary embodiments of the invention are described in more detail hereinafter with reference to the figures, in which schematically:

FIG. 1 shows a block diagram of a plant according to the invention.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

The rotor or rotor package is identified with 10 in the FIGURE. Its design is known. A top plate section 12 can be seen for accommodating upper punches (not shown) and a lower plate section 14 for accommodating lower punches (not shown). A die plate arranged therebetween, for example in the form of individual segments with holes for receiving material to be pressed, has been left out for purposes of presentation. The cam carrier 15 for the cams for the upper punch (not shown) is located above the upper punch guide 12. The portrayed rotor package 10 is a component of a rotary press not shown in detail, for example of a known design, and is caused to rotate by a corresponding drive. The operation of the rotary press will not be addressed in detail. The rotary press is shown in the FIGURE as a block 16. The rotary press 16 is operated, controlled and monitored by a computer system 18. For this purpose, the rotary press 16 has a first interface 20. The controlling, operation and monitoring of the rotary press 16 will not be addressed in detail, however. It can be conventional.

A memory and communication component 22 is securely arranged on the edge of the curve carrier of the rotor package 10. By means of its interface (not shown), it can communicate with a second interface 24 of a read/write device 26 that in turn communicates with a third interface 28 of the computer system 18. The computer system 18 and read/write device 26 can form a unit as indicated by the box 30 drawn in a dashed line. A second communication path 34 between the memory and communication component 22 and read/write device 26 can be free of contact or wireless, or contacted. In the latter case, a plug-in connection is provided between the parts. The communication or transmission of data between the computer system 18 and rotary press 16 by means of a first communication path 32 can also be contact-free or wireless, or contacted as it is known per se.

A large amount of data such as identification, specification and/or operating data and/or monitoring data that are characteristic of the rotor type and its mode of operation can be saved in the memory and communication component 22. This includes for example the production type (single-layer, two-layer or three-layer production of tablets, special production, station number, etc.). Overall, the production type defines the operation and control of the rotary press 16 by means of the computer system 18. This also includes for example the number of stations of the rotor package 10. The operating life and operating hours of the rotor package 10 can be saved in the memory and communication component 22 in order to maintain service levels and prevent malfunctions from overly long service intervals or exceeding the operating life. Special configurations can also be saved in order to automatically recognize whether for example the maximum rotor speed, maximum pressure, etc. is being maintained.

Before the initial operation of the rotor package 10, it is important to read out the data saved in the memory and communication component 22 and read the data into a memory of the computer system 18 to automatically adapt the operating and control software for the rotary press 10 by reading out the newly saved data in the computer system 18, and automatically adjusting the control and operating software to the new rotor type. No manual entries in the terminal of the computer system 18 are necessary. The control and operating software can therefore be very quickly changed error-free.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below. This completes the description of the preferred and alternate embodiments of the invention. Those skilled in the art may recognize other equivalents to the specific embodiment described herein which equivalents are intended to be encompassed by the claims attached hereto.

The invention claimed is:

1. A method for operating a plant to produce tablets that has at least one rotary press and one computer system, wherein the computer system contains operating and control software for controlling and monitoring the operation of the rotary press, and wherein the rotary press is designed for installing different types of rotors, characterized in that in a memory of the computer system all specific data are stored necessary for the operation for all of the different types of rotors adapted to be installed in the rotary press and identification data of the types of rotors are associated with the specific data, that a record is saved in a memory and communication component on the rotors which belongs to the respective rotor type, and before a rotor type installed is initially operated, the record is read out and saved in the computer system, and the computer system adapts the operating and control software to the rotor type by means of the data of the record,
wherein the specific data includes six categories selected from operating life, station number, desired speed, maximum pressure, past operating hours, future operating hours, life cycle of the rotor packages, actual speed, and actual pressure.

2. The method according to claim 1, characterized in that the record is read out when the rotor is located outside of the rotary press.

3. The method according to claim 1, characterized in that the record is read out when the rotor is located inside of the rotary press.

4. The method according to claim 1, characterized in that the data are transferred from and to the memory and communication component free of contact.

5. The method according to claim 1, characterized in that the data are transferred from and to the memory and communication component by means of a wired plug-in connection.

6. The method according to claim 1, characterized in that rotor-specific identification and/or instruction and/or operation and/or monitoring data are saved in the memory and communication component.

7. The method according to claim 1, characterized in that an identification for the rotor type is saved in the memory and communication component, and the operating and control software is designed to identify and display an incorrect rotor.

8. The method according to claim 1, characterized in that the operating life and operating hours of the rotor are saved in the memory and communication component.

9. The method according to claim 1, characterized in that the manufacturing information on the rotor is saved in the memory and communication component.

10. A plant for producing tablets comprising a rotary press and a computer system for controlling, operating and monitoring the operation of the rotary press, the memory stores data specific to the type of rotors, wherein a first communication path is provided between the rotary press and computer system, characterized in that a memory and communication component is attached to the rotor , the rotary press being designed for installing different types of rotors for the press, wherein a first communication path is provided between the rotary press and computer system, characterized in that a memory and communication component is attached to the rotor, the memory stores data specific to the type of rotors, and a second communication path to the computer system can be set-up between the memory and communication component, a separate read/write device for the memory and communication component is connected to the computer system,
wherein the specific data includes six categories selected from operating life, station number, desired speed, maximum pressure, past operating hours, future operating hours, life cycle of the rotor packages, actual speed, and actual pressure.

11. The plant according to claim 10, characterized in that the read/write device is attached to the frame of the rotary press.

12. A method for operating a plant to produce tablets that has at least one rotary press and one computer system, wherein the computer system contains operating and control software for controlling and monitoring the operation of the rotary press, and wherein the rotary press is designed for installing different types of rotors, characterized in that in a memory of the computer system all specific data are stored necessary for the operation for all of the different types of rotors adapted to be installed in the rotary press and identification data of the types of rotors are associated with the specific data, that a record is saved in a memory and communication component on the rotors which belongs to the respective rotor type, and before a rotor type installed is initially operated, the record is read out and saved in the computer system, and the computer system adapts the operating and control software to the rotor type by means of the data of the record,
wherein the specific data includes operating life, station number, desired speed, maximum pressure, past and future operating hours, life cycle of the rotor packages, actual speed, and actual pressure.

* * * * *